United States Patent [19]

Kasting

[11] Patent Number: 4,459,950
[45] Date of Patent: Jul. 17, 1984

[54] LUBRICATION PUMP MOUNTING ASSEMBLY

[75] Inventor: Edward W. Kasting, Seymour, Ind.

[73] Assignee: Cummins Engine Company, Inc., Columbus, Ind.

[21] Appl. No.: 331,799

[22] Filed: Dec. 17, 1981

Related U.S. Application Data

[62] Division of Ser. No. 104,914, Dec. 18, 1979, Pat. No. 4,321,896.

[51] Int. Cl.$^3$ .................. F02B 77/14; F04B 17/00
[52] U.S. Cl. .................. 123/195 A; 123/198 C; 417/364
[58] Field of Search .................. 123/DIG. 1, DIG. 6, 123/195 R, 195 A, 196 R, 198 C; 417/364

[56] References Cited

U.S. PATENT DOCUMENTS

| | | | |
|---|---|---|---|
| 1,647,434 | 11/1927 | Chorlton | 123/195 A |
| 2,784,710 | 3/1957 | Kremser | 123/195 A |
| 2,857,773 | 10/1958 | Slonek | 123/90.15 |
| 3,502,059 | 3/1970 | Davis et al. | 123/195 R |
| 4,321,896 | 3/1982 | Kasting | 123/195 A |
| 4,334,836 | 6/1982 | Kubis | 123/195 A |

*Primary Examiner*—Ronald B. Cox
*Attorney, Agent, or Firm*—Sixbey, Friedman & Leedom

[57] ABSTRACT

Method and apparatus for precisely positioning a gear plate (10) on the block (12) of an internal combustion engine equipped with an accessory drive gear train (22, 24, 26, 28, 30, 32, 34 and 36) are disclosed whereby the precise positioning of the gear plate (10) results in the precise alignment of the gears mounted thereon. The present invention achieves this result by utilizing the shafts (56 and 58) of two of the gears (34 and 36) in the gear train as primary and secondary positioning means. Primary and secondary positioning bores (66) are formed in the engine block (12) and in the gear plate (10) and the primary and secondary gear shafts (60) inserted therein to position the gear plate (10) first at a point along a first axis relative to the engine block (12) and secondly at a point along a second axis relative to the engine block (12). The gears (22, 24, 26, 28, 30, 32, 34 and 36) mounted on the gear train are thus maintained in correct alignment relative to the engine crankshaft and camshaft gears (14, 18) and to adjacent mating gears (32, 34, 36, 26). Insertion of the positioning gear shafts (60) into the corresponding positioning bores (66) in the engine block facilitates connection of these gears with the engine lubrication system and results in these gear shafts (66) being self-lubricating. Also disclosed are a mounting arm (88) integral with the gear plate (10) for variably positioning a radial gear (26) which drives the fan clutch assembly (86) and a lubrication pump assembly (95) having a mounting frame (104) which is received by aperture (104a) in the gear plate (10) and is driven by one of the radial gears (22) in the accessory gear train (22, 24, 26, 28, 30, 32, 34 and 36).

5 Claims, 5 Drawing Figures

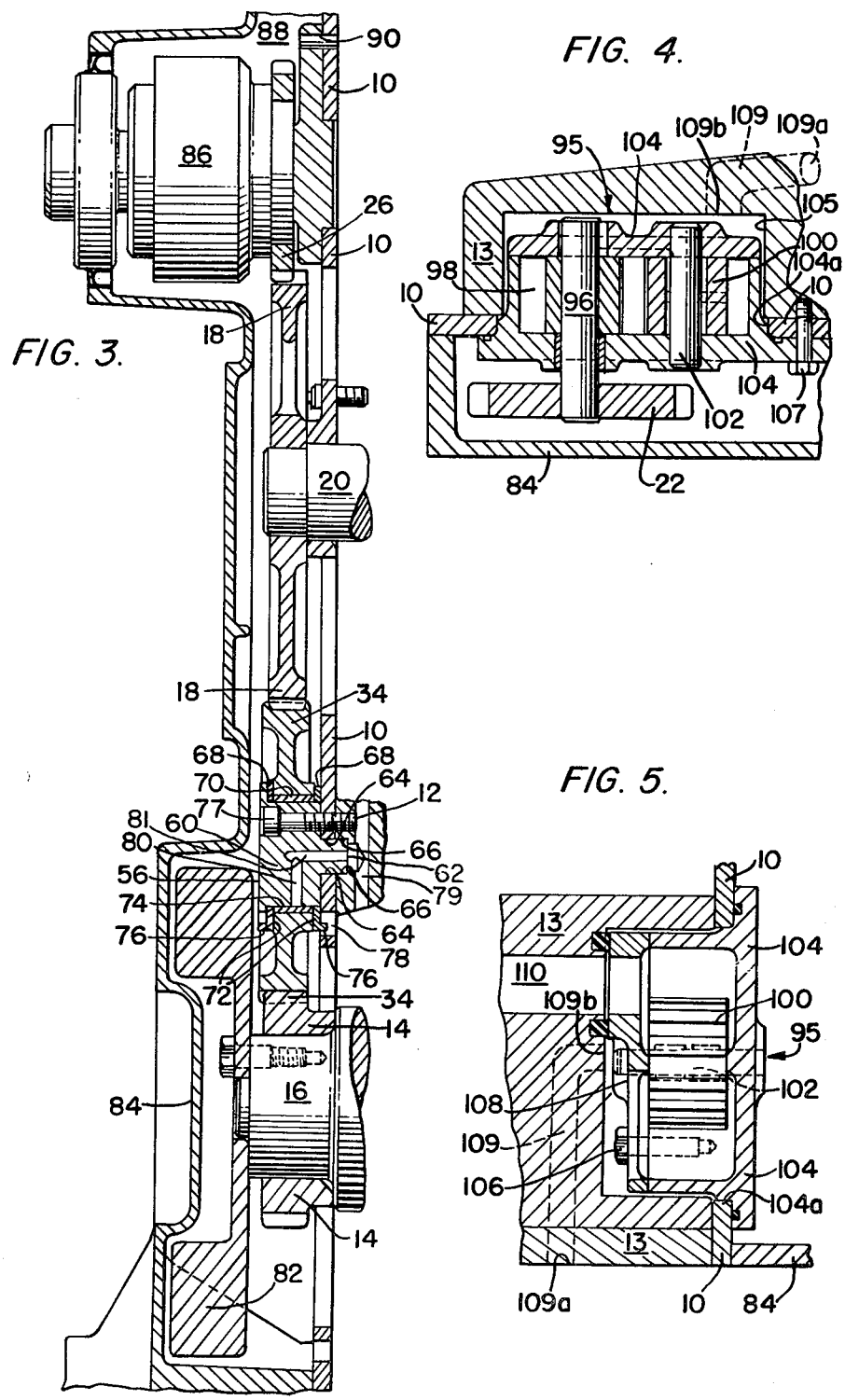

LUBRICATION PUMP MOUNTING ASSEMBLY

This application is a division, of application Ser. No. 104,914, filed 12/18/79 now U.S. Pat. No. 4,321,896.

DESCRIPTION

1. Technical Field

This invention relates to an internal combustion engine gear plate assembly upon which a gear train for driving the engine accessories may be mounted and properly positioned relative to the engine crankshaft and camshaft.

2. Background Art

In most applications of internal combustion engines, numerous engine components and accessories must be driven from the engine crankshaft. Such components and accessories include not only those which are essential to engine operation like the camshaft, fuel pump and lubrication pump and air compressor, but also those which are required by the particular engine application. For example, a vehicle engine is frequently required to provide drive torque to a variety of vehicle and engine related accessories such as a hydraulic pump for power steering, refrigerant compressor for an air conditioner and an electrical alternator, a water pump for engine cooling or a fan clutch for a cooling fan. Mounting such components and accessories on or adjacent an internal combustion engine to permit drive torque to be transmitted in a convenient manner to each of the engine components and accessories is often a tricky design problem.

In heavy duty internal combustion engines, especially of the compression ignition type, a gear train is normally employed between the crankshaft and the engine components and accessories driven thereby to insure adequate torque transmitting capability. Such gear trains generally require plural idler gears which must also be mounted on the engine, thereby further complicating the problem of providing proper support and drive to the various engine components and accessories. Due to the rotational speed at which the engine components and accessories must be driven and the rather high torque requirements of such components and accessories, the individual gears making up the accessory drive train must be of very high precision quality. The performance capability of such high quality gearing may not be fully realized unless each gear making up the drive train is very carefully positioned to provide proper gear lash between the meshing gear teeth. Failure to achieve optimum gear lash can result in severe damage to the gear teeth requiring a costly and time consuming overhaul of the gear train.

A variety of mounting approaches have been developed in an attempt to accomodate the above noted design requirements. For example, in some engines the accessory drive gears are mounted directly on the engine block, such as is disclosed in U.S. Pat. Nos. 2,857,773 and 3,502,059. However, mounting the gears directly on the engine block requires the machining of a multiplicity of bores in the block to receive the shafts of the accessory and idler gears, and these bores must be precisely spaced relative to the crankshaft, the camshaft and each other. An error in machining even one bore could result in an unuseable engine block which must be discarded at considerable expense to the manufacturer. Even when the bores are positioned correctly, separate alignment apparatus is required to achieve proper gear lash. Such gear alignment apparatus as that disclosed in the aforementioned United States patents, while helpful to obtain correct gear position and maintain the gear lash within acceptable limits, necessitates the use of several specially machined parts and extensive time consuming maneuvers to achieve the required gear alignment.

Mounting the accessories and accessory drive gear train on a separate frame or plate which is then mounted on the engine block, such as illustrated in U.S. Pat. No. 1,647,434 to Chorlton, eliminates the precision machining required to position the gear shaft receiving bores correctly in the engine block. Gear shaft receiving bores must still be positioned precisely on the gear plate; however, if a machining error is made only the gear plate is rendered unusable. The cost to the manufacturer of discarding an incorrectly bored gear plate is significantly less than the cost of discarding an incorrectly bored engine block. However, the use of a gear plate does not avoid all alignment problems. Once the plate is precisely bored to receive the shafts of the gears to be mounted thereon, the plate itself must be positioned relative to the engine block to permit accurate alignment of the crankshaft and camshaft gears with the other gears of the accessory drive gear train. In the past this has been a difficult and time consuming procedure which had to be performed upon assembly of a new engine and repeated, at least in part, every time the gear plate was removed and remounted on the engine. One previously used alignment procedure for installing a new gear plate-like structure, described in Shop Manual V-1710 C.I.D 1978, pages 14-11 and 14-12, published by Cummins Engine Company, Inc., assignee of the present application, requires the installation of a pair of guide studs on the engine block for initially positioning the gear plate and mandrels in the camshaft bores to further fix the location of the plate. Alternately, the camshafts themselves in combination with an indicator gauge could be used in place of mandrels to obtain true concentricity of the camshaft bores in the block and in the gear plate. After the plate was positioned and the capscrews temporarily installed and tightened, the gears had to be assembled in position, the gear lash checked, and the gears removed to permit the gear plate to be reamed and doweled. The guide studs were then removed at this point and the capscrews holding the gear plate to the engine block tightened to the correct torque. The gears of the gear train could then be installed and the lash rechecked. If the lash exceeded the minimum acceptable value, the procedure had to be repeated until the gear lash was within acceptable limits. Obviously, a procedure of this type is extremely time consuming, thereby significantly increasing production and repair expense.

In short, the prior art has failed to disclose apparatus or method for positioning an internal combustion engine gear plate on which are mounted engine accessories and a gear train for driving such accessories whereby accurate plate and gear alignment are achieved with a minimum of manufacturing and assembly time and cost.

DISCLOSURE OF THE INVENTION

The basic object of this invention is to overcome the disadvantages of the prior art as listed above and, in particular, to provide apparatus and method for simply and precisely positioning a gear plate and the accessory drive gear train mounted thereon on the block of an internal combustion engine.

A more specific object of this invention is to provide a gear plate for mounting the accessory gear train on the block of an internal combustion engine having primary and secondary positioning bores which align with corresponding primary and secondary positioning bores on the gear plate to receive the shafts of two of the gears of the gear train, thereby accurately positioning the gear plate with respect to the engine block and the gears mounted thereon with respect to the crankshaft and camshaft gears and each other with a minimum of precision machining and assembly time.

Another object of this invention is to provide a gear plate assembly for supporting a plurality of engine accessories and for mounting an accessory gear train on the block of an internal combustion engine whereby the plate may be precisely positioned with respect to the engine block by utilizing pre-existing structural elements, i.e., idler shafts and gear shaft receiving bores.

Yet another object of this invention is to provide a method for precisely positioning a gear plate for mounting the accessory gear train on an internal combustion engine relative to the engine block which includes the steps of machining primary and secondary positioning bores in the engine block, machining corresponding primary and secondary positioning bores in the gear plate and inserting the shafts of two of the gears in the gear train through the bores come the disadvantages of the prior art as listed above and, in particular, to provide apparatus and method for simply and precisely positioning a gear plate and the accessory drive gear train mounted thereon on the block of an internal combustion engine.

A more specific object of this invention is to provide a gear plate for mounting the accessory gear train on the block of an internal combustion engine having primary and secondary positioning bores which align with corresponding primary and secondary positioning bores on the gear plate to receive the shafts of two of the gears of the gear train, thereby accurately positioning the gear plate with respect to the engine block and the gears mounted thereon with respect to the crankshaft and camshaft gears and each other with a minimum of precision machining and assembly time.

Another object of this invention is to provide a gear plate assembly for supporting a plurality of engine accessories and for mounting an accessory gear train on the block of an internal combustion engine whereby the plate may be precisely positioned with respect to the engine block by utilizing pre-existing structural elements, i.e., idler shafts and gear shaft receiving bores.

Yet another object of this invention is to provide a method for precisely positioning a gear plate for mounting the accessory gear train on an internal combustion engine relative to the engine block which includes the steps of machining primary and secondary positioning bores in the engine block, machining corresponding primary and secondary positioning bores in the gear plate and inserting the shafts of two of the gears in the gear train through the bores in the gear plate and into the engine block.

Other and more specific objects of this invention will become apparent from the following Brief Description of the Drawings and Best Mode for Carrying Out the Invention.

BRIEF DESCRIPTION OF THE DRAWINGS

FIG. 3 is a cross-sectional view of the gear plate assembly of FIG. 2 taken along lines 3—3;

FIG. 4 is a cross-sectional view of the oil pump assembly mounted on the gear plate of FIG. 2 taken along lines 4—4; and FIG. 5 is a cross-sectional view of the oil pump assembly of FIG. 2 taken along lines 5—5.

BEST MODE FOR CARRYING OUT THE INVENTION

Figure 1:
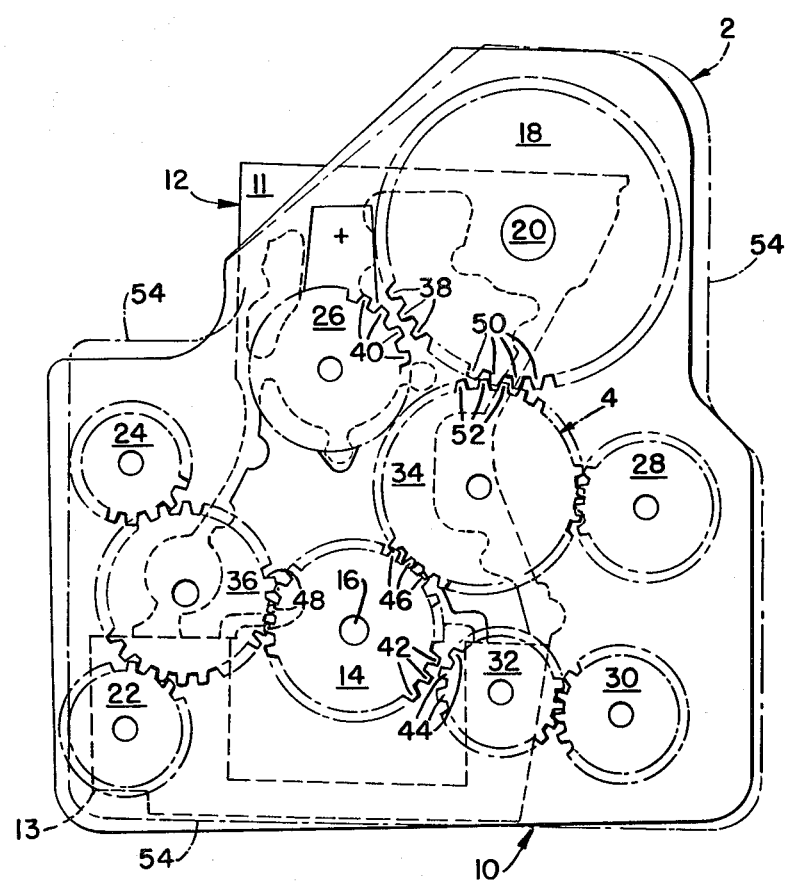
FIG. 1 is a front elevational view of a gear plate assembly formed in accordance with the subject invention prior to the gear plate being properly aligned wherein potential misalignment of the gears has been greatly exaggerated.

The novel features of the present invention can be best understood with reference to FIG. 1 which illustrates a gear plate assembly 2 including an accessory gear train 4 mounted on a gear plate 10 which, in turn, is mounted on the engine block 12 of an internal combustion engine. Engine block 12 may be of the type which includes a main frame 11 mounted above an oil pan adapter or ladder frame 13, all of which is described in U.S. Pat. application Ser. No. 22,647, filed Mar. 21, 1979, assigned to the same assignee as the present application and incorporated herein by reference. The main drive gear or crankshaft gear 14 is mounted directly on the projecting end of crankshaft 16 rotatably mounted in block 12 and the camshaft gear 18 is mounted directly on the camshaft 20 which is also rotatably mounted in block 12. Gear plate 10 includes suitably machined holes (not shown) to permit passage of the crankshaft and camshaft therethrough. The accessory gear train illustrated in FIG. 1 includes radial gears 22, 24, 26, 28 and 30 which provide drive torque to various engine accessories and idler gears 32, 34 and 36 which provide driving connections between the crankshaft and camshaft gears and between the crankshaft and one or more of the radial gears. Each of these idler gears is rotatably mounted on a shaft journaled in an assembly bolted onto gear plate 10. For reasons which will be explained in greater detail hereinbelow, the shafts on which idler gears 34 and 36 are mounted are formed to project into corresponding bores (not shown) in engine block 12. Each of these bores is connected with the lubrication circuit through internal channels formed within the engine block 12. As will also be explained in more detail below, lubrication fluid is thus directed to the bearing surfaces of the individual idler shafts to provide continuous lubrication thereof. In the specific embodiment of FIG. 1, gear 22 drives the oil pump, gear 24 drives the water pump, gear 26 drives the fan clutch, gear 28 drives the air compressor and gear 30 drives the hydraulic pump with each of the driven accessories being mounted directly on plate 10.

If the gear plate 10 is not aligned accurately with respect to the crankshaft and camshaft the teeth of most of the gears cannot mesh properly. For purposes of illustration only, the effects of gear plate misalignment is illustrated in greatly exaggerated form in FIG. 1, wherein plate 10 has been rotated counterclockwise and displaced to the left from the properly aligned position (illustrated in dashed lines).

As illustrated, teeth 38 of camshaft gear 18 are so far away from teeth 40 of fan gear 26 that there is no contact therebetween as would be required for engine operation. The misalignment of gear plate 10 of the type illustrated in FIG. 1 would also result in improper meshing between other gear teeth as illustrated in greatly exaggerated form in FIG. 1. For example, teeth 42 of crankshaft gear 14 and teeth 44 of idler gear 32 would be misaligned as would be teeth 46 and 48 with respect to the teeth of gears 34 and 36, respectively. Yet another problem created by the improper alignment of gear plate 10 is shown in FIG. 1 by the way in which teeth 50 of camshaft gear 18 contact the mating teeth of idler gear 34. Although misalignment of the degree illustrated in FIG. 1 could not occur, the amount of torque which must be transmitted through gear train 4 is such that even a slight misalignment can result in excessive gear tooth wear and possible failure of the gear train.

These and other potential problems are avoided by providing means to position the gear plate accurately upon installation of the plate on the engine block so that the gears mounted thereon are properly aligned with respect to crankshaft gear 14 and camshaft gear 18 and that this alignment is maintained during engine operation and repair. As discussed hereinabove, previously known means, such as that utilized by the assignee of the present application, for achieving this objective have required special apparatus as well as long and involved procedures. Moreover, the difficult and time consuming process must be repeated, at least in part, each time the gear plate is removed and replaced or remounted. The present invention provides apparatus and method for obtaining optimum gear plate and, thus, gear train alignment which is significantly simplified in comparison to heretofore known apparatus and methods. As a result, the initial installation of the gear plate and its subsequent remounting or replacement are no longer the involved, costly procedures they once were.

Figure 2:
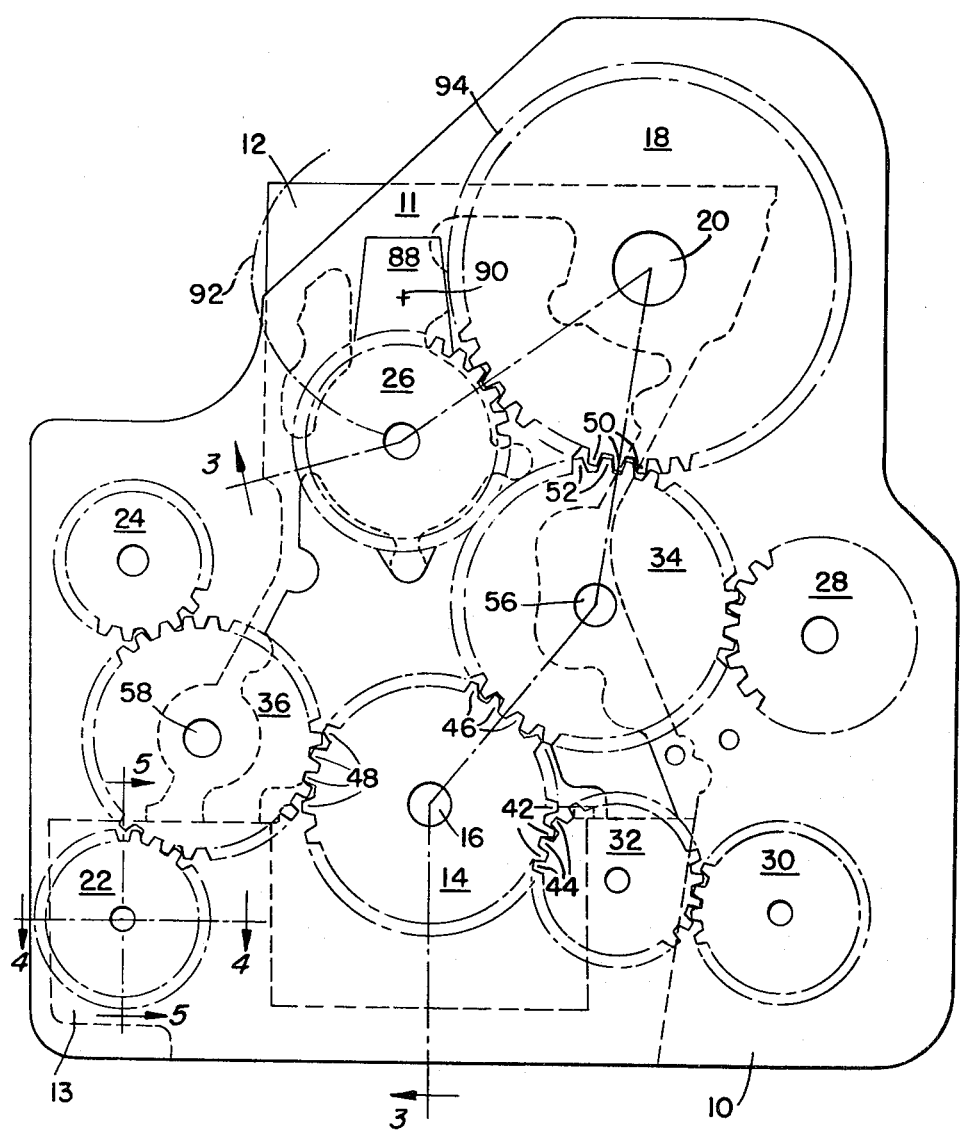
FIG. 2 is a front elevational view of the gear plate assembly of FIG. 1 after proper alignment has been achieved.

FIG. 2 illustrates the gear plate of FIG. 1 accurately positioned with respect to the crankshaft and camshaft so that the gear train mounted thereon is precisely aligned. Dashed lines 54 in FIG. 1 show the correctly aligned position gear plate 10 occupies in FIG. 2. It can thus be clearly seen how a relatively small variation from the required gear plate position could result in the gear malfunction and failure discussed above. As can be observed from FIG. 2 when the gear plate is properly aligned, the teeth of mating gears all mesh properly. By properly holding manufacturing tolerances on the gear shaft receiving bores (not illustrated) in the gear plate 10, and by also holding the individual gears and shafts on which each is mounted to predetermined manufacturing tolerances, proper gear lash can be assured between all mating gears merely by fixing plate 10 with respect to two indexing positions with respect to engine block 12.

The manner in which this optimum gear plate and gear alignment is achieved by the present invention is best understood with reference to FIGS. 2 and 3. Gear plate 10 includes suitably machined bores (not shown) for mounting the shafts of accessory gears 22, 24, 28 and 30 and idler gears 32, 34 and 36 as well as openings to accommodate the outward projections of the crankshaft and the camshaft. The locations of these bores is determined by the distances between the centers of adjacent mating gears required to provide gear lash within acceptable limits when such gears are formed within preset manufacturing tolerances. In addition, as mentined hereinabove, indexing bores in the engine block are provided to correspond with the bores on gear plate 10 for idler gears 34 and 36 so that the shafts on which these gears are mounted may be formed to extend in indexing relationship into the corresponding indexing bores formed in block 12.

Briefly stated, the present invention utilizes the shafts of two of the gears in the gear train to position the gear plate correctly on the engine block. Although it is preferred to use the shafts of idler gears 34 and 36 for this purpose, the shafts of any two gears may be mounted on the gear plate first to position the gear plate relative to the engine block at a fixed point along a first primary axis and, secondly, to fix the position of the gear plate relative to the engine block at a fixed point along a second axis parallel to the first. Only two indexing points are required to properly position plate 10 both rotationally and translationally with respect to the engine block 12. In the preferred embodiment shown in FIG. 2, shaft 56 on which idler gear 34 is rotatably mounted functions as the primary gear plate positioning means and shaft 58 on which idler gear 36 is rotatably mounted functions as the secondary gear plate positioning means. The holes in gear plate 10 (not shown) through which shafts 56 and 58 are inserted are required for mounting gears 34 and 36 on the gear plate, irrespective of any positioning function the gear shafts might serve. Therefore no additional machining of the gear plate for guide studs or dowels such as has been required in the past to achieve correct gear plate position is needed.

The way in which primary gear shaft 56 mounts gear plate 10 to the engine block is illustrated in detail in FIG. 3, which is a cross-sectional view of the gear plate and a portion of the engine block and gear train taken along lines 3—3 of FIG. 1. Primary gear shaft 56 includes stationary idler shaft 60 including a positioning projection 62 for insertion through primary pilot bore 64 in gear plate 10 into corresponding primary pilot bore 66 in the engine block 12. Although FIG. 3 illustrates the preferred diametric profile of stationary idler shaft 60 and positioning projection 62, other diametric profiles of these structures than the circular, constant cross-sectional profile shown may be utilized. The only requirement which must be satisfied by the diametric profiles of stationary idler shaft 60 and positioning projection 62 is that they permit simultaneous mounting of the gear and positioning of the plate with respect to an indexing position on the engine block. A first pair of thrust bearings 68 and a bushing 70 on idler shaft 60 function to rotatably mount gear 34 relative to idler shaft 60 while simultaneously fixing the axial position of gear 34 relative to the engine block. Tab 76 prevents thrust bearings 72 from rotating. Hole 78 in gear plate 10 accommodates tab 76 of one of the pair of thrust bearings 72 positioned directly against the gear plate. Three mounting bolts 77 (only one of which is illustrated in FIG. 3) secure gear shaft 56 to the cylinder block.

As illustrated in FIG. 3 engine block 12 may include internal lubrication channels such as channel 79 into which pilot bore 66 is extended to form a lubrication flow path for the idler gear bearing. In particular, idler shaft 60 preferably includes a longitudinal lubrication channel 80 and radial channel 81 in positioning projection 62 to permit lubricating fluid to be conducted from channel 79, through channels 80 and 81 to provide a continuous supply of lubrication fluid to the bearing surfaces of the shaft of idler gear 34.

Additionally shown in FIG. 3 are vibration damper 82 mounted on the end of crankshaft 16 and gear cover 84, which encloses the vibration damper and the accessory gear train. The structure and function of gear cover 84 are described in detail in U.S. Pat. application Ser. No. 974,562 filed Dec. 29, 1978 and assigned to the same assignee as the present application.

Radial gear 26 is mounted on the input to the fan clutch assembly 86, illustrated in FIG. 3, to provide driving torque to the fan of the internal combustion engine. The clutch assembly 86 is mounted on an arm support 88 which, in turn, is supported on the gear cover and engine block for adjustable rotational positioning about an axis 90. The fan clutch assembly 86 may be rotated upwardly along the arc illustrated by dashed lines 92 in FIG. 2 into engagement at point 94 with camshaft gear 18 to raise the position of the engine fan for certain engine applications (such as automotive applications) which require the fan to be placed well above the lowermost portion of the engine. Support arm 88 also includes an internal lubrication flow path (not shown) to supply lubrication to the fan clutch assembly. Placement of the fan clutch assembly in the raised position just described will require appropriate modifications to the shape of the gear plate.

FIGS. 4 and 5 illustrate in detail the manner in which radial gear 22 drives the oil pump, generally referred to at 95, which is integrally housed within the engine ladder frame 13, the operation of which is described in U.S. Pat. application Ser. No. 90,478 filed Nov. 1, 1979, now abandoned assigned to the assignee of the present application and entitled REVERSIBLE OIL PAN ASSEMBLY, the disclosure of which is hereby incorporated by reference. Gear 22 is journaled on drive shaft 96 which is drivingly connected with a first pump element 98. First pump element 98 engages second pump element 100 which is mounted on countershaft 102. Pump elements 98 and 102 are rotatably mounted within a two part mounting frame 104 positioned to extend into a recess 105 in engine ladder frame 13. Frame 104 extends through an aperture 104a contained in gear plate 10. Bolt 106 holds the sections of mounting frame 104 together and a plurality of mounting bolts 107 (only one of which is illustrated in FIG. 4) affix the frame 104 to ladder frame 13. Frame 104 does not directly contact ladder frame 13 in any way even though recess 105 functions essentially as the oil pump housing. As explained in the aforementioned U.S. Patent Application entitled REVERSIBLE OIL PAN ASSEMBLY, oil is drawn from the oil pan through a sump pipe connected with the oil pan and through a passage 109, illustrated in dashed lines, contained in ladder frame 13 wherein the passage 109 is connected at one end 109a to the sump pipe and at the other end 109b to the suction side 108 of the oil pump. Upon being pressurized by the pump, oil is delivered to the engine lubrication system through passage 110 in ladder frame 13. Passage 110 communicates with a lubrication inlet (not shown) in the engine main frame (not shown). Crankshaft gear 14 drivingly engages idler gear 36 which in turn drivingly engages radial gear 22. The rotation of gear 22 activates pump elements 98 and 100, causing oil to be drawn into oil pump 95 and discharged from there into the engine lubrication system.

Two of the remaining accessory gears in the gear train, 28 and 30, and the mounting supports therefor are illustrated in detail in FIG. 5 of copending application Ser. No. 974,562, filed on Dec. 29, 1978, the disclosure of which is hereby incorporated by reference.

INDUSTRIAL APPLICABILITY

The gear plate and method of accurately positioning the plate of this invention finds its primary applicability in an internal combustion engine which utilizes a gear train to power engine accessories. This type of gear train is commonly used in compression ignition engines of the type employed in over-the-road vehicles. However, the subject gear plate may also be used advantageously in many other engine applications such as portable compressor units and marine propulsion systems.

I claim:

1. An accessory mounting assembly for being mounted on an internal combustion engine having an oil lubrication system including a lubrication fluid sump and a supply circuit for providing lubricant from the sump to the engine components and further including an engine block having a generally planar end wall containing a recess opening into said planar end wall, the recess containing an inlet communicating with the lubrication fluid sump and an outlet communicating with the supply circuit, said assembly comprising
    (a) a gear plate for supporting engine accessories when mounted on the planar end wall and for mounting an accessory drive train designed to supply driving torque to an engine accessory, said gear plate containing an aperture positioned to align generally with said recess when said gear plate is mounted on said planar end wall; and
    (b) lubrication pump means for being mounted in a position to receive driving torque from the drive train and for pumping lubricant from the lubrication fluid sump into the supply circuit, said lubrication pump means including a pump inlet for receiving lubrication fluid, a pump outlet for discharging lubrication fluid and frame means for direct connection with said gear plate to cause said lubrication pump means to extend through said aperture into said recess and to cause said pump inlet and outlet to align generally with said recess inlet and outlet, respectively.

2. The accessory mounting assembly defined in claim 1 further including driving means for delivering torque from the drive train to said lubrication pump means, said driving means including a first gear mounted on said frame means, a first pump element mounted on said frame means and drivingly connected to said first gear, a second pump element mounted on said frame means and engaged with said first pump element.

3. The accessory mounting assembly defined in claim 1 wherein said frame means is spaced from said planar end wall.

4. The accessory mounting assembly defined in claim 2 wherein the internal combustion engine includes a crankshaft and said driving means further includes a crankshaft gear mounted on the crankshaft for rotation therewith, an idler gear mounted on said gear plate as part of said accessory drive train and which drivingly engages said first gear.

5. The accessory mounting assembly defined in claim 1 wherein said frame means includes a two part housing and fastening means for holding said two part housing together.

* * * * *